US012103713B1

(12) United States Patent
Dallmann et al.

(10) Patent No.: US 12,103,713 B1
(45) Date of Patent: Oct. 1, 2024

(54) ATTITUDE DETERMINATION AND CONTROL SYSTEM (ADCS)

(71) Applicant: Triad National Security, LLC, Los Alamos, NM (US)

(72) Inventors: Nicholas Dallmann, Los Alamos, NM (US); James Wren, Los Alamos, NM (US); Michael Proicou, Los Alamos, NM (US); Hannah Mohr, Los Alamos, NM (US); Jerry Delapp, Los Alamos, NM (US); John Martinez, Los Alamos, NM (US); Daniel Seitz, Los Alamos, NM (US); Paul Stein, Los Alamos, NM (US); Adam Warniment, Los Alamos, NM (US)

(73) Assignee: Triad National Security, LLC, Los Alamos, NM (US)

( * ) Notice: Subject to any disclaimer, the term of this patent is extended or adjusted under 35 U.S.C. 154(b) by 1485 days.

(21) Appl. No.: 16/049,942

(22) Filed: Jul. 31, 2018

Related U.S. Application Data

(60) Provisional application No. 62/540,296, filed on Aug. 2, 2017.

(51) Int. Cl.
*B64G 1/24* (2006.01)
*B64G 1/28* (2006.01)
*B64G 1/32* (2006.01)

(52) U.S. Cl.
CPC .............. *B64G 1/244* (2019.05); *B64G 1/285* (2013.01); *B64G 1/286* (2013.01); *B64G 1/32* (2013.01)

(58) Field of Classification Search
CPC .......... B64G 1/283; B64G 1/285; B64G 1/32; B64G 2001/245
See application file for complete search history.

(56) References Cited

U.S. PATENT DOCUMENTS

| 4,230,294 | A | 10/1980 | Pistiner |
| 4,425,813 | A | 1/1984 | Wadensten |
| 4,740,680 | A | 4/1988 | Frisch |
| 5,698,842 | A | 12/1997 | Fallon et al. |
| 6,471,161 | B1 * | 10/2002 | D'Ambrosio ............ B64G 1/32 |
| | | | 701/13 |
| 6,515,221 | B1 * | 2/2003 | Varga .................... B64G 1/283 |
| | | | 244/165 |

(Continued)

FOREIGN PATENT DOCUMENTS

| CN | 106843038 B | 12/2017 |
| WO | 2018120442 A1 | 7/2018 |

OTHER PUBLICATIONS

Todd M Melton, "Notice of Allowance", issued Mar. 30, 2021, U.S. Appl. No. 16/043,345.

(Continued)

*Primary Examiner* — Richard Green
(74) *Attorney, Agent, or Firm* — LeonardPatel PC; Micheal A. Leonard, II; Sheetal S. Patel

(57) ABSTRACT

An attitude determination and control system (ADCS) may include relatively large momentum wheels (i.e., reaction wheels) for improved momentum storage and magnetic torque rods that enable low power sun pointing and dissipate angular momentum imparted during deployment or by differential drag on the space vehicle. The momentum wheels, magnetic torque rods, or both may be algorithmically selected and driven to perform various maneuvers.

19 Claims, 7 Drawing Sheets

(56) References Cited

U.S. PATENT DOCUMENTS

| | | | | |
|---|---|---|---|---|
| 6,681,649 | B2* | 1/2004 | Hyde | B64G 1/286 244/165 |
| 8,772,690 | B2 | 7/2014 | Smith et al. | |
| 9,853,353 | B2* | 12/2017 | Judd | B64G 1/425 |
| 10,472,098 | B2* | 11/2019 | Marshall | B64G 1/283 |
| 11,155,367 | B2* | 10/2021 | Kou | B64G 1/32 |
| 2019/0316908 | A1 | 10/2019 | Zhang et al. | |

OTHER PUBLICATIONS

ESTCube-1 Wikipedia Page, https://en.wikipedia.org/wiki/ESTCube-1 (last accessed Apr. 24, 2014).

Final Office Action issued in U.S. Appl. No. 14/745,875 on Dec. 26, 2017.

Geert Smet, et al., "Managing Reaction Wheel Microvibration on a High Resolution EO Small Space Aircraft", European Space Mechanisms & Tribology Symposium, ESTEC, 2013, Noordwijk, The Netherlands.

Jason R Roberson, "Non-Final Office Action", issued Jul. 27, 2018, U.S. Appl. No. 14/745,875.

Jason R. Roberson, "Advisory Action", issued Feb. 22, 2018, U.S. Appl. No. 14/745,875.

Jason R. Roberson, "Non-Final Office Action", issued on Jul. 28, 2017, U.S. Appl. No. 14/745,875.

Jason R. Roberson, "Restriction Requirement", issued on May 18, 2017 for U.S. Appl. No. 14/745,875.

Space Micro MSS-01,02 Medium Sun Sensors Brochure, http://www.spacemicro.com/assets/datasheets/guidance-and-nav/MSS.pdf (May 2, 2014).

AST Bearings, "Bearings and Related Products and Services", 2012, accessed on the internet at https://www.astbearings.com/pillow-blocks-flanges.html.

Jason R Roberson, "Final Office Action", issued Feb. 21, 2019, U.S. Appl. No. 14/745,875.

Jason R Roberson, "Notice of Allowance", issued Apr. 19, 2019, U.S. Appl. No. 14/745,875.

Liebe, "Accuracy Performance of Star Trackers—A Tutorial", IEEE Transactions on Aerospace and Electronic Systems, vol. 38, No. 2, Apr. 2002, pp. 587-599 (2002).

Pong, "High-Precision Pointing and Attitude Estimation and Control Algorithms for Hardware-Constrained Spacecraft", Massachusetts Inst. of Technology, Jun. 2014, 254 pages, in particular pp. 51-54, 137-155. (2014).

Thai, "Applications for FPGAs on Nanosatellites", York Univ., Apr. 2014, 113 pages, in particular pp. 32-43. (2014).

Todd M Melton, "Advisory Action", issued Dec. 22, 2020, U.S. Appl. No. 16/043,345.

Todd M Melton, "Final Office Action", issued Oct. 13, 2020, U.S. Appl. No. 16/043,345.

Todd M Melton, "Non-Final Office Action", issued May 15, 2020, U.S. Appl. No. 16/043,345.

Wei et al., "Star Sensor Calibration Based on Integrated Modelling with Intrinsic and Extrinsic Parameters", Measurement vol. 55, Sep. 2014, pp. 117-125. (2014).

* cited by examiner

RELATED ART

ATTITUDE DETERMINATION AND CONTROL SYSTEM (ADCS)

CROSS-REFERENCE TO RELATED APPLICATION

This application claims the benefit of U.S. Provisional Patent Application No. 62/540,296 filed Aug. 2, 2017. The subject matter of this earlier-filed application is hereby incorporated by reference in its entirety.

STATEMENT OF FEDERAL RIGHTS

The United States government has rights in this invention pursuant to Contract No. DE-AC52-06NA25396 between the United States Department of Energy and Los Alamos National Security, LLC for the operation of Los Alamos National Laboratory.

FIELD

The present invention generally relates to space flight control, and more particularly, to an attitude determination and control system (ADCS) that includes momentum wheels and torque rods.

BACKGROUND

Small space vehicles, such as CubeSats, are increasingly being used to perform functionality that was previously performed by larger satellites. These small space vehicles provide a more rapidly deployable, lower cost option for space missions. As with larger space vehicles, it is beneficial to be able to orient small space vehicles for their desired mission, or to accurately correct their orientation. Accordingly, an ADCS capable of providing these features for small space vehicles may be beneficial.

SUMMARY

Certain embodiments of the present invention may provide solutions to the problems and needs in the art that have not yet been fully identified, appreciated, or solved by conventional ADCSs. For example, some embodiments pertain to an ADCS that includes relatively large momentum wheels for improved momentum storage and magnetic torque rods that enable low power sun pointing and dissipate angular momentum imparted during deployment or by differential drag on the space vehicle. The momentum wheels, magnetic torque rods, or both may be algorithmically selected and driven to perform various maneuvers.

In an embodiment, an ADCS includes a plurality of momentum wheels and a plurality of magnetic torque rods arranged in a perpendicular orientation with respect to one another. The plurality of magnetic torque rods are each configured to generate torque when a current is applied thereto. The ADCS also includes a processing card that is configured to algorithmically select and control at least one of the plurality of momentum wheels, the plurality of magnetic torque rods, or both, to execute a desired maneuver.

In another embodiment, a space vehicle includes a top section including a high gain helical antenna, a middle section including an ADCS, and a bottom section that includes a power subsystem. The ADCS includes a plurality of momentum wheels and a plurality of torque rods. The ADCS is configured to orient the space vehicle based on pointing requirements for the high gain helical antenna with an accuracy of 15° or better.

In yet another embodiment, an ADCS includes a plurality of magnetic torque rods arranged perpendicular to one another along an x-axis, a y-axis, and a z-axis. The plurality of magnetic torque rods each generate torque when a current is applied thereto. The ADCS also includes a processing card that is configured to algorithmically select and control at least one of the plurality of magnetic torque rods to execute a desired maneuver. The processing card is configured to control the plurality of torque rods in accordance with $$\tau = J\omega + skq_e$$

where $\tau$ is command torque, J is a moment of inertia of the space vehicle, $\omega$ is an angular velocity of a space vehicle, $q_e$ is a quaternion error vector between a command and a determined attitude, and s is a sign of the scalar quaternion error term. After deriving the command torque, the processing card is configured to calculate a dipole moment using $$m_{req} = \frac{B \times \tau}{|B|^2}$$

where $m_{req}$ is a dipole moment, B is the modeled Earth's magnetic field, and $\tau$ is the command torque. The processing card is also configured to deliver a corresponding current command from the dipole moment to be delivered to one or more of the plurality of torque rods.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Some embodiments of the present invention pertain to an ADCS that includes relatively large momentum wheels (i.e., reaction wheels) for improved momentum storage and magnetic torque rods that enable low power sun pointing and dissipate angular momentum imparted during deployment or by differential drag on the space vehicle. The momentum wheels, magnetic torque rods, or both may be algorithmically selected to perform various maneuvers. In some embodiments, the momentum wheels are sized to allow ground target pointing while hosting a 1.5 U payload. The momentum wheels in an implemented embodiment each have a moment of inertia of $1.68 \times 10^{-5}$ kgm$^2$. However, any suitable moment of inertia may be provided without deviating from the scope of the invention.

The pointing requirement of the space vehicle may be primarily driven by a directional high-gain helical antenna in some embodiments. The high-gain radio in an implemented embodiment operates at approximately 2 GHz with a right-hand circular polarization. The antenna gain in this embodiment falls off 1 dB at about a 10° beam width and 3 dB at about a 35° beam width. The performance goal of an ADCS in some embodiments may be to point with an accuracy of at least 15° to ensure reliable operation of the high-gain communication system.

Space Vehicle

Figure 1:
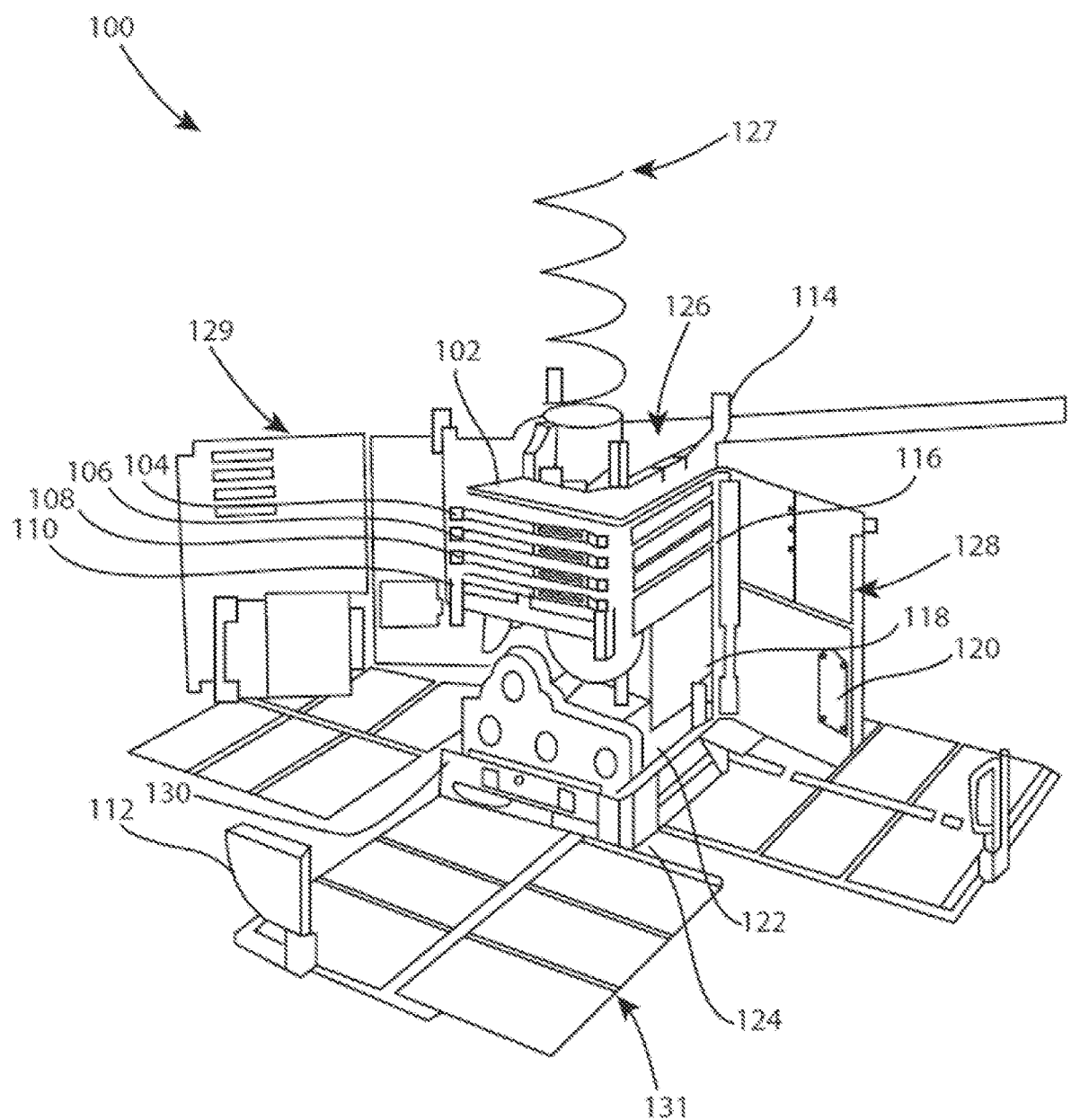
FIG. 1 is a perspective view illustrating a space vehicle with an open chassis, according to an embodiment of the present invention.

The ADCS is incorporated into a space vehicle, and provides attitude determination and control for the space vehicle. FIG. 1 is a perspective view illustrating a space vehicle 100 with an open chassis, according to an embodiment of the present invention. While space vehicle 100 is a CubeSat, the ADCS of some embodiments may be applied to any desired space vehicle without deviating from the scope of the invention. Space vehicle 100 has a 1.5 U form factor in this embodiment. As such, even with an additional 1.5 U payload, space vehicle 100 still fits within a standard 3 U dispenser.

Space vehicle 100 includes three sections in this embodiment—a top section 126, a middle section 128, and a bottom section 130. Top section 126 includes a communications analog radio housing 102 analog processing and antennas (e.g., high gain helical antenna 126 and communications antennas 114). The pointing requirement of space vehicle 100 is primarily driven by directional high-gain helical antenna 127. The high-gain radio operates at about 2 GHz with a right-hand circular polarization. The antenna gain falls off 1 dB at about a 10° beam width and 3 dB at about a 35° beam width.

Middle section 128 is a card cage with an openable casing 129. Middle section 128 serves as the body of space vehicle 100. Middle section 128 houses a high band software defined radio (SDR) 104, a low band SDR 106, command and data handling (C&DH) 108, and an ADCS 110. The performance goal of ADCS 110 is to point with an accuracy of at least 15° to ensure reliable operation of the high-gain communication system.

High band SDR 104, low band SDR 106, C&DH 108, and ADCS 110 are all connected to a common backplane 116 that facilitates communications therebetween, as well as with other components of space vehicle 100. A star field sensor (SFS) 118 is located below ADCS 110 and enables star tracking. A circular cutout in backplane 116 and a hole in the casing (not visible in this view) allow the SFS to have an unobstructed view out of space vehicle 100. Three sun-vector sensors (SVSs) 120 are attached to the space vehicle body.

Bottom section 130 includes a power subsystem 122 (e.g., batteries, power circuitry, etc.) and payload connections 124. The batteries provide 109 kJ of power when space vehicle 100 is in darkness. Solar panels 131 are operably connected to power subsystem 122 to provide power from sunlight. Solar panels 131 provide 24 watts of power when normal to the sun, leaving an ample margin to power a payload even during a ground station pass, during which the primary bus consumes 13 watts of power. A pair of magnetometers 112 are located at the ends of two of solar panels 131.

In this embodiment, high band SDR 104, low band SDR 106, C&DH 108, ADCS 110, and SFS 118 are each driven by respective independent processing cards. Each processing card is controlled by a 32-bit ARM processor (e.g., a Cortex-M4™ processor with 1 MB of flash memory), for instance. The processor is clocked at 168 MHz. The processor is attached to an external SRAM chip providing additional memory (e.g., an additional 8 MB) and an external flash chip providing further storage (e.g., 1 GB). The processor is also paired with a field programmable gate array (FPGA) that controls many of the autonomous functions of the space vehicle. The FPGA provides a memory-mapped interface to other devices, as well as watchdog timers that will reboot the processor in the event of a system fault.

A 51-pin connector and a custom interposer printed circuit board (not shown) provide access to the subsystems and internal power rails of space vehicle 100. A second connector (not shown) provides access to the battery and charging circuitry. The payload would be attached to space vehicle 100 at bottom section 130. An additional benefit of the payload connectors is that they also provide an easy, non-invasive, communication route to the subsystems of space vehicle 100 after it is fully assembled.

ADCS Hardware Design

Due to the 1.5 U form factor of the space vehicle of some embodiments, the ADCS subsystem may be designed to be relatively compact. The primary ADCS subsystem may contain the processing circuit board along with four momentum wheels and three torque rods for attitude actuation. The ADCS circuit board layout may incorporate holes in the circuit board to allow the momentum wheels to pass through the plane of the board. The primary ADCS unit may also contain a solid-state gyroscope mounted on the momentum wheel carriage. The thickness of the primary ADCS unit in an implemented embodiment is approximately 4 cm (⅓ of a CubeSat standard unit).

The body coordinates of the space vehicle may be chosen so that the high-gain helical antenna is considered the +z axis. The SVS units may be located on the +x, −x, and −z axes. The magnetometers may be located on the +y and −y solar panels. The SFS may point along the −y axis of the space vehicle.

Figure 2:
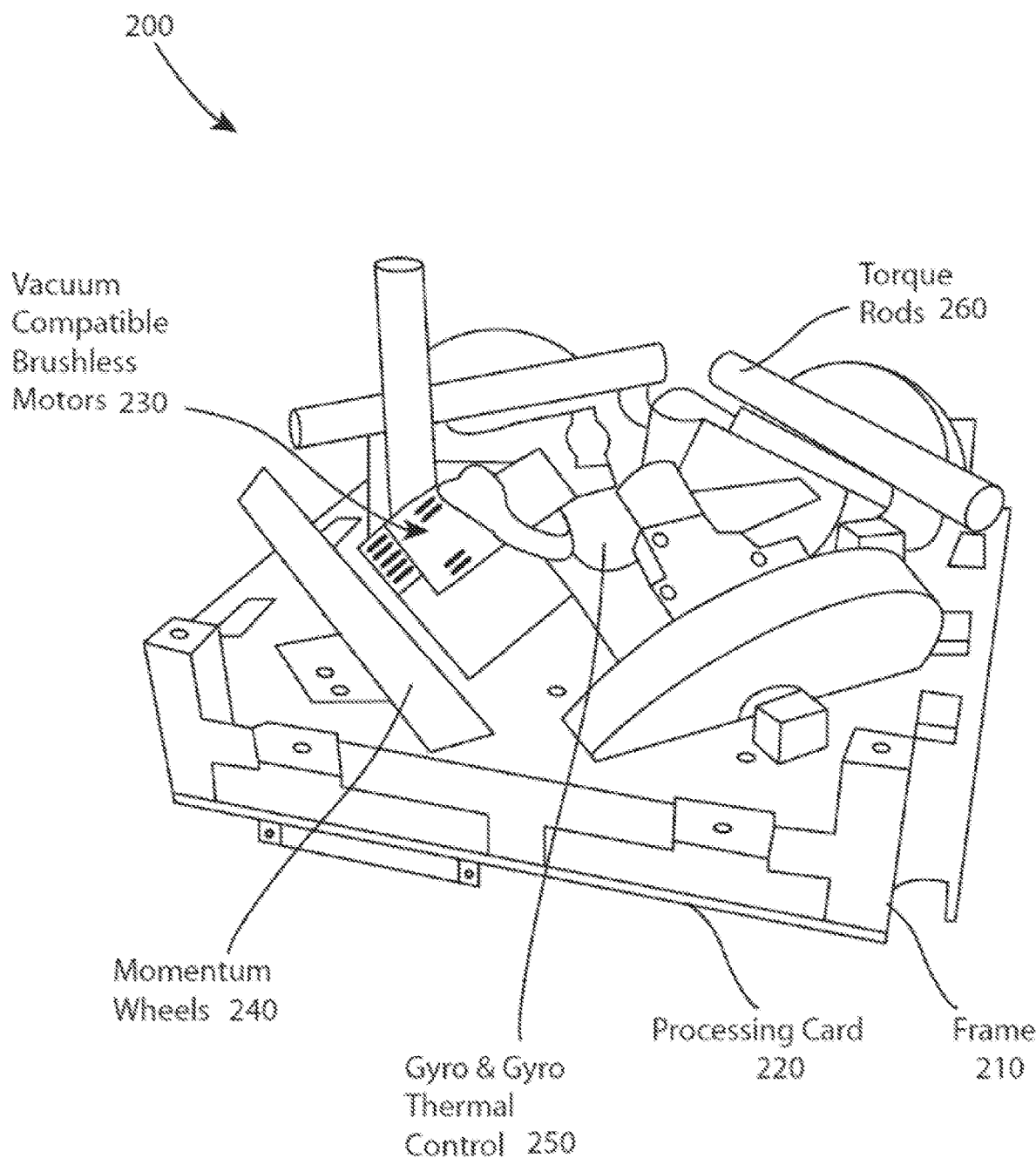
FIG. 2 is a perspective view illustrating an ADCS, according to an embodiment of the present invention.

FIG. 2 is a perspective view illustrating an ADCS 200, according to an embodiment of the present invention. ADCS 200 includes a frame 210 that houses its components. In some embodiments, ADCS 200 is enclosed in a metal housing for shielding and noise reduction purposes (see metal housing 310 of FIG. 3B, for example). An independent processing card 220 is connected to the bottom of frame 210 and drives operation of ADCS 200. Processing card 220 may be controlled by a 32-bit ARM processor, for instance. The processor may be clocked at 168 MHz, for example. The processor may be attached to an external SRAM chip providing additional memory and an external flash chip providing further storage. The processor may also be paired with a FPGA that controls many of the autonomous functions of the space vehicle. The FPGA may provide a memory-mapped interface to many of the external devices, as well as watchdog timers that will reboot the processor in the event of a system fault.

Four vacuum compatible brushless motors 230 each drive respective momentum wheels 240 in this embodiment. Gyroscopes and gyroscope thermal control 250 propagate the attitude solution when other approaches are not available. Three magnetic torque rods 260 provide attitude actuation. When currents are applied thereto, magnetic torque rods 260 generate a small amount of torque. As such, magnetic torque rods 260 are only suitable for certain operations, such as de-tumbling, static sun pointing, and nadir pointing operations.

Figure 3A:
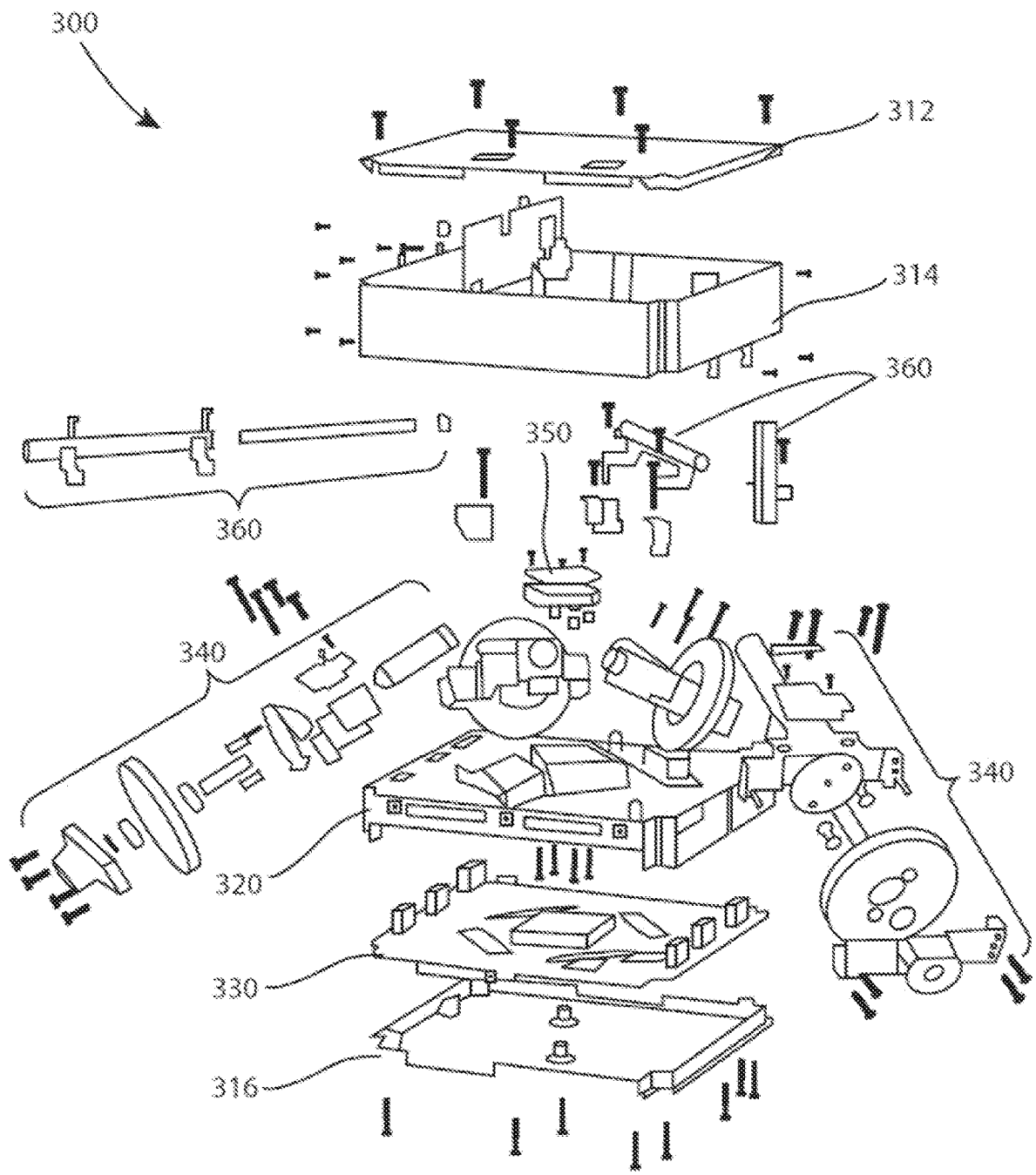
FIG. 3A is an exploded perspective view illustrating an ADCS, according to an embodiment of the present invention.
Figure 3B:
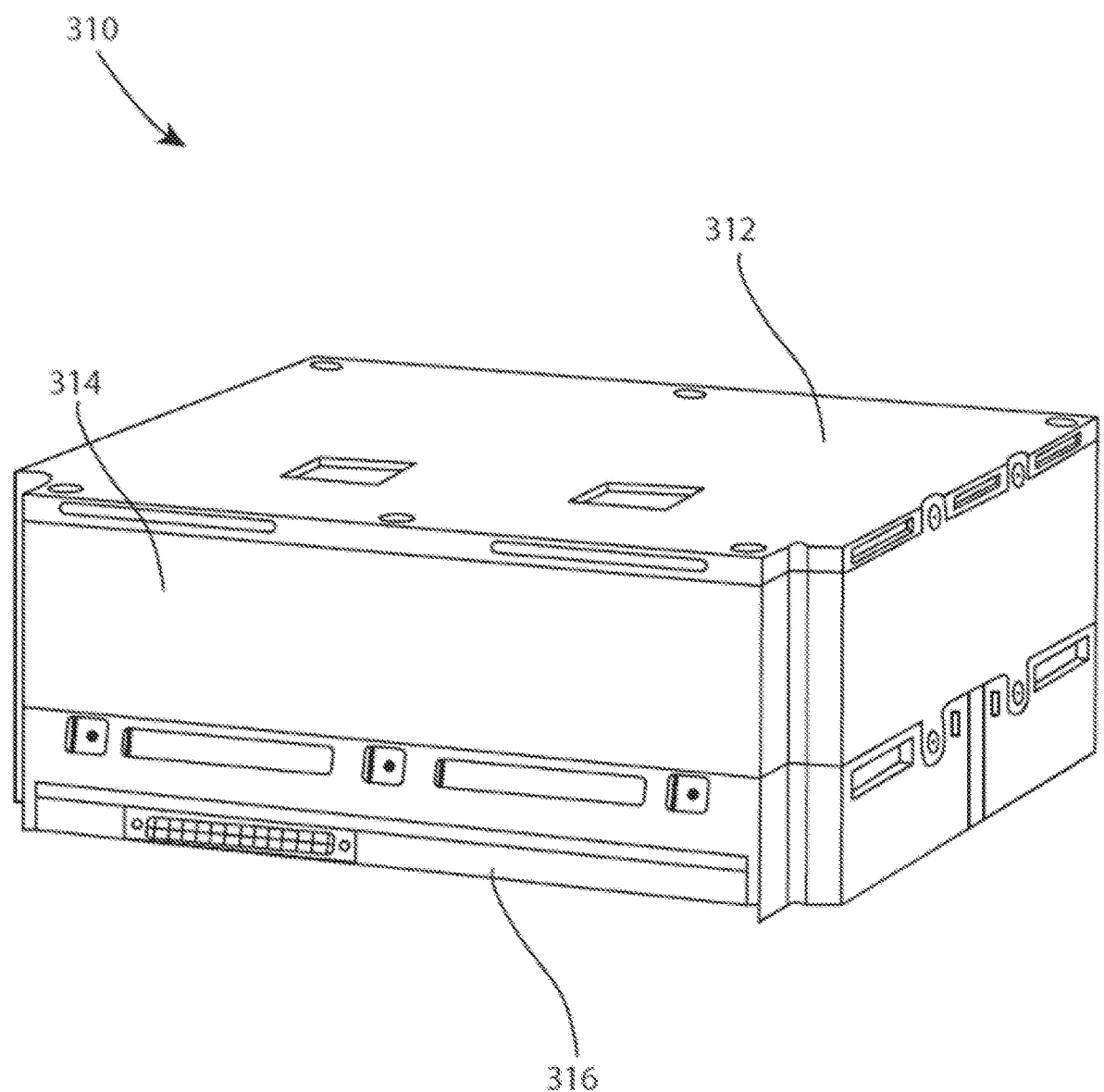
FIG. 3B is a perspective view illustrating a metal housing that houses internal components of the ADCS of FIG. 3A for shielding and noise reduction purposes, according to an embodiment of the present invention.

FIG. 3A is an exploded perspective view illustrating an ADCS 300 and FIG. 3B illustrates assembled ADCS 300 in a housing 310, according to an embodiment of the present invention. Housing 310 includes a top portion 312, a side portion 314, and a bottom portion 316 that collectively form a "box" when assembled. Housing 310 provides shielding and noise reduction.

ADCS 300 also includes a frame 320 that houses its components. An independent processing card 330 that includes a processor 332 and an FPGA 334 is connected to the bottom of frame 320 and drives operation of ADCS 300. Four motor and reaction wheel subassemblies 340 provide torque for ADCS 300. Gyroscopes and gyroscope thermal control 350 propagate the attitude solution when other approaches are not available. Three magnetic torque rods 360 provide attitude actuation.

Figure 4A:
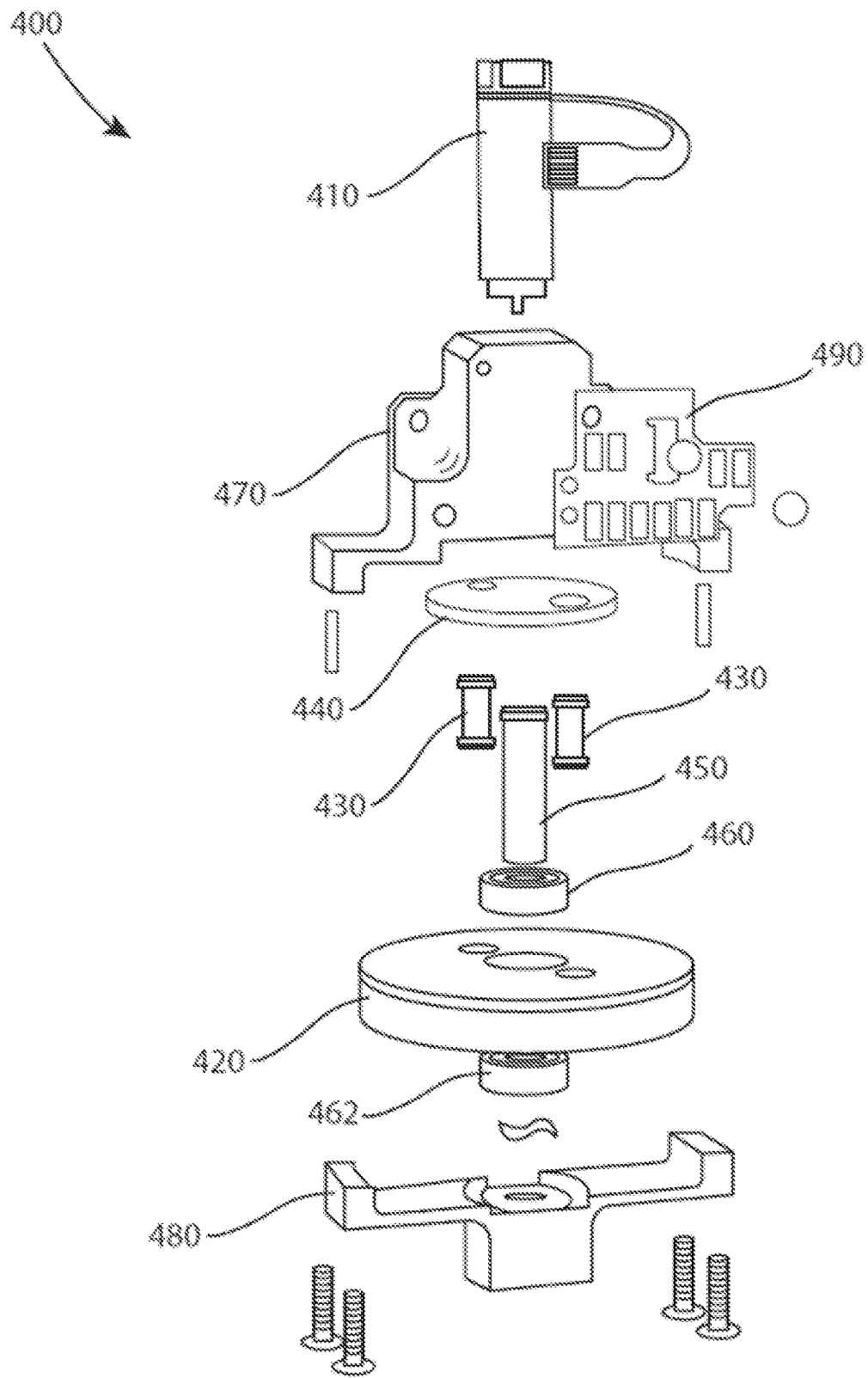
FIG. 4A is an exploded perspective view illustrating a motor and reaction wheel subassembly, according to an embodiment of the present invention.
Figure 4B:
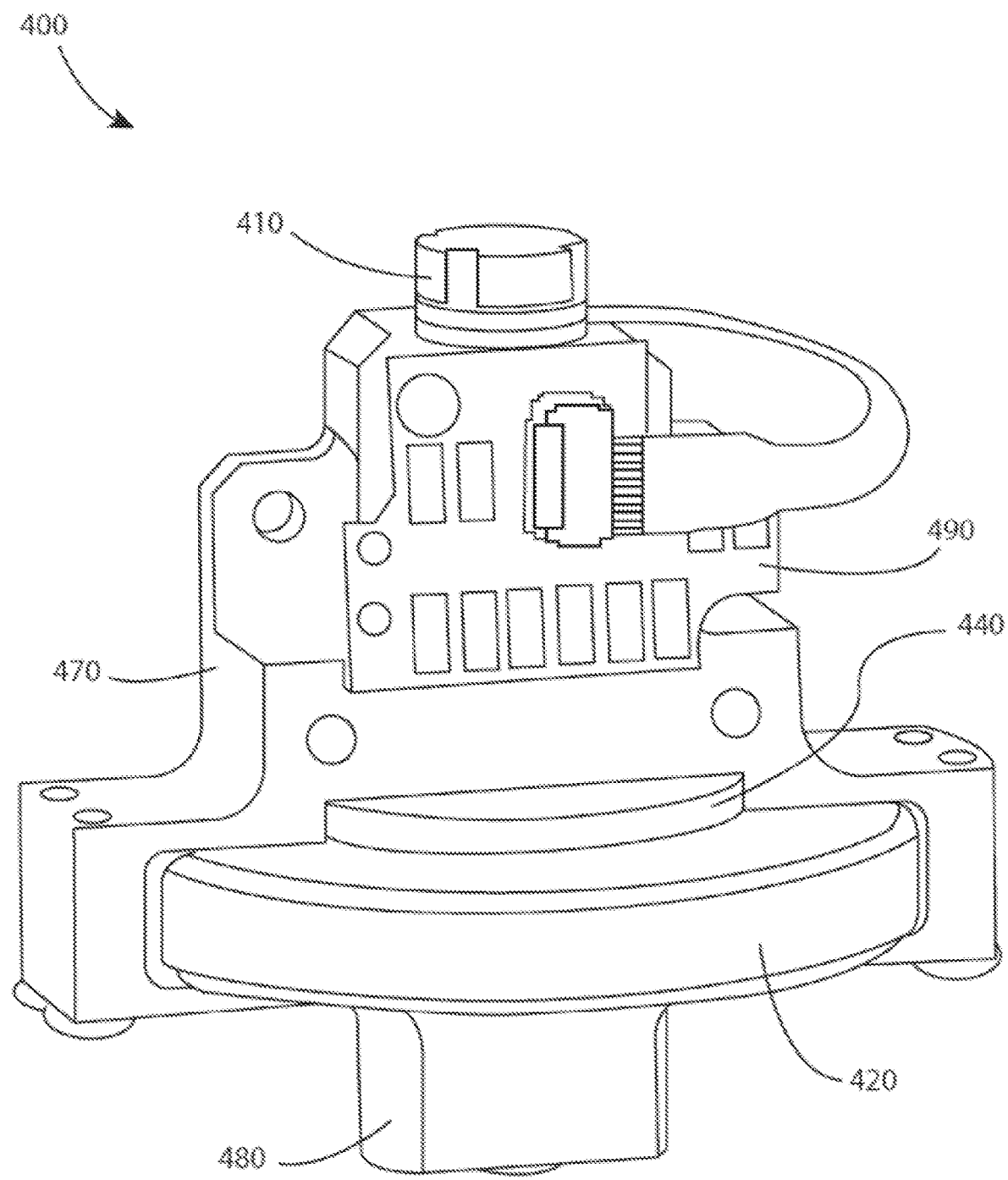
FIG. 4B is an assembled perspective view illustrating the motor and reaction wheel subassembly of FIG. 4A, according to an embodiment of the present invention.
Figure 5:
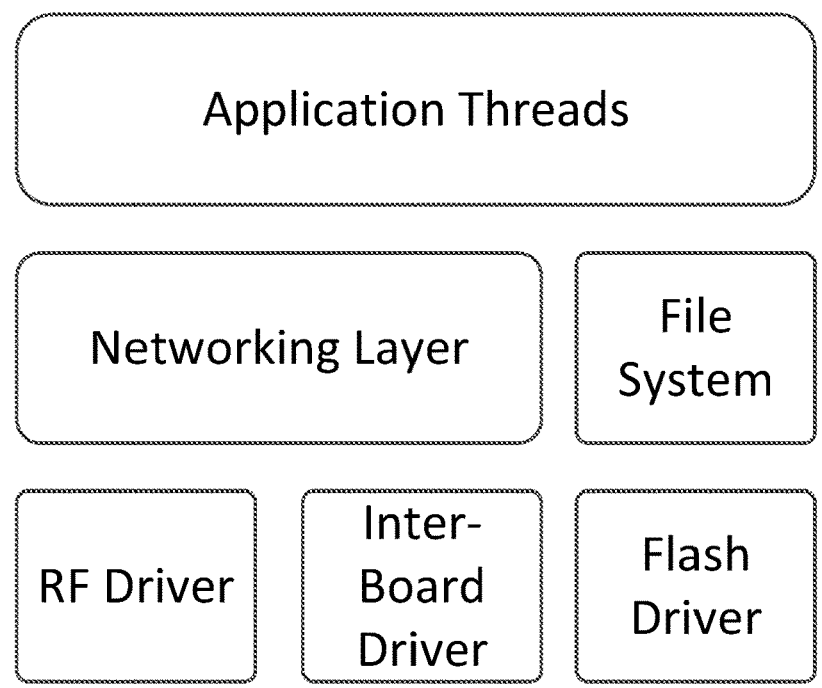
FIG. 5 illustrates a real-time operating system (RTOS) architecture.

FIGS. 4A and 4B are exploded and assembled perspective views, respectively, illustrating a motor and reaction wheel subassembly 400, according to an embodiment of the present invention. In some embodiments, motor and reaction wheel subassembly 400 may be motor and reaction wheel subassembly 340 of FIG. 3A. A vacuum compatible brushless motor 410 drives momentum wheel 420. In some embodiments, different wheels with different mass properties may be attached to motor 410. The ADCS can then control spacecraft of differing sizes (mass) by selecting wheels of the proper size and moment of inertia.

Couplings 430 are used to transfer torque from a drive wheel 440 to momentum wheel 420. Couplings 430 may be made from a flexible material (e.g., a silicone rubber) to dissipate shock loads as motor 410 is started or stopped. Momentum wheel 420 rotates on a shaft 450 using bearings 460, 462. A motor mount 470 and an end mount 480 are assembled and the through hole drilled in a single operation to ensure alignment of the rotating assembly. A small interface board 490 interfaces motor 410 to the main ADCS board (e.g., processing card 330 of FIG. 3A).

ADCS Software Design

The processors of some embodiments run a real-time operating system (RTOS), such as that provided by ARM's Keil™ MDK development package. FIG. 3 illustrates an RTOS architecture 300. Internal flash memory of the ARM processor is divided into three banks in an embodiment. Bank 0 is 208 MB in size and holds the recovery code that is loaded prior to launch. The Bank 0 code is not intended to be modified after launch and represents the safe recovery mode after a system reset. The other two banks, A and B, are each 384 MB in size and contain the operational flight code that can be updated while on-orbit. Code updates are loaded onto Banks A and B in an alternating manner. The system of alternating updates facilitates easy fallback to the previous version if there is a problem with the most recent code update.

The flight control code was written in the C programming language in this embodiment. However, any suitable programming language may be used without deviating from the scope of the invention. Each of the space vehicle subsystems share a common set of code libraries for performing operating system functions, filesystem operations, inter-board communications, and common user interface functions in this embodiment. Additionally, a software library, NavLib, was developed that contains functions for performing common mathematical operations, such as vector, quaternion, and matrix arithmetic, linear algebra, orbit determination, astronomical ephemeris, and statistical modeling. The code base is maintained within a revision control system.

The ADCS system in some embodiments is driven by a multi-threaded control loop running on its ARM processor. One thread may be dedicated to listening for incoming commands from the C&DH or from the ground station via the radios. Another thread may be dedicated to running a 1 Hz control loop that determines the attitude of the space vehicle and then updates the attitude actuators to execute the required attitude maneuver.

Attitude Determination

Some embodiments use two primary solutions for attitude determination. The first approach uses the SVSs in combination with the magnetometers. The second approach uses the SFS. The SVS/magnetometer solution, when available, may be produced in near real-time. The SFS solution is much more accurate, but may be at least 10 seconds old in some embodiments.

Neither the SVS or magnetometers can provide a complete attitude solution by themselves, and therefore, only work in combination with each other. The sun-vector is determined in some embodiments by one of three pinhole cameras located in the +x, −x, and −z body axes, respectively. The sun position is then converted to inertial coordinates using a sun ephemeris formula and the current time.

The magnetometer data provides the second reference point for the attitude solution. The Earth's magnetic field intensity and direction may be measured independently by four magnetometers onboard the space vehicle. Two magnetometers may be located on the +y and −y solar panels, and the third and fourth magnetometers may be located within the body of the spacecraft.

The magnetic field may be measured in body coordinates and then converted to inertial coordinates by comparison to the world magnetic model (WMM) magnetic field model. This comparison requires knowledge of the current time and the current space vehicle geo-location. The TRIAD algorithm may be used to combine the sun-vector and magnetometer measurements into the full satellite attitude solution in inertial coordinates.

Because the SVS/magnetometer attitude solution depends on knowledge of the time and space vehicle position, the space vehicle should have the clock set and a current orbital element set uploaded. In some embodiments, the space vehicle clock is not set until the first successful ground contact. Shortly thereafter, the current two-line element (TLE) may be uploaded to the space vehicle. However, only then is the onboard algorithm able to determine the attitude using the SVS/magnetometer solution. Another disadvantage of the SVS/magnetometer solution is that it only works during periods when the space vehicle is in sunlight.

Unlike the SVS and magnetometer sensors, the SFS provides the ability to determine the attitude without knowledge of the current time or geo-location of the space vehicle. The SFS operates by taking an image of the star-field and comparing to an on-board star catalog. If a valid catalog match is found, the attitude is determined by applying the QUEST algorithm to all of the positively matched stars in the field in some embodiments. Typical SFS attitude solutions are accurate to 0.01 degrees.

The SFS may have several drawbacks, however. The SFS in some embodiments requires the space vehicle to be rotating at less than a few degrees per second in order to limit smearing of the star-field. The SFS image must also not contain the sun, moon, or Earth within its field of view in some embodiments. Furthermore, if an attitude solution is found, it may be 10-200 seconds old in some embodiments. If an attitude estimate is currently available, then the time required for subsequent SFS solutions is about 10 seconds in some embodiments.

Solid-state gyroscopes may be used to propagate the attitude solution when it is not currently available by other means. The magnetometer data is essentially always available, but the SVS data should be propagated when the sun is not in the field of view of any of the three SVS sensors, either because the current attitude of the space vehicle puts the sun out of the field of view or because the space vehicle is in the dark phase of its orbit.

The attitude solution from the SFS should always be propagated using the gyroscopes because it is at least 10 seconds old in some embodiments, and often much older. The point at which the propagated SFS solution is no longer better than a current SVS/magnetometer solution depends on the drift rate of the gyroscopes.

Attitude Actuation

There are two mechanisms by which the attitude of the space vehicle is controlled in some embodiments: momentum wheels and magnetic torque rods. The momentum wheels provide the necessary torque to perform ground target tracking, but they consume much more power and have limited lifetimes. The magnetic torque rods consume less power, but provide much less torque. As a result, the torque rods are only effective for certain actions, such as de-tumbling, static sun pointing, and nadir pointing operations.

The momentum wheel system of some embodiments includes four wheels arranged in a pyramid configuration. The motor for each wheel may be capable of producing about 1 milliNewton meter (mNm) of torque. The individual motor speeds are controlled by the FPGA of the processing card in some embodiments, which may run a proportional-derivative (PD) control loop. The desired motor torques may be chosen by determining the error angle between the desired attitude and the current attitude solution. A PD control loop may be applied to the attitude error angle to generate the desired torque setting. The individual wheels may then be driven to the required speed setting to generate the requested overall torque on the space vehicle.

The magnetic torque rods may operate using the same control law as the motors to determine the desired torque on the space vehicle. The magnetic field may be measured using the magnetometers and the appropriate current may be applied to the torque rods to generate the requested torque on the space vehicle. However, the maximum torque generated by each individual rod may only be about 10 μNm in some embodiments, which is two orders of magnitude less than the momentum wheels. In practical use, the current draw of each individual rod is limited to 0.1 A in some embodiments, which limits the torque any individual rod may apply to about 2 μNm.

Gyroscopes

During periods when a current attitude solution is not available, the attitude should be propagated using the gyroscopes. The current attitude solution will not be available in some embodiments during gaps in the sun coverage by the SVS sensors and while the SFS is searching for a star-field match. Gaps in the SVS coverage in some embodiments can last up to 32 minutes, when the space vehicle is passing over the nighttime side of the Earth. Gaps in the SFS coverage can potentially be indefinite if the spacecraft is rotating too quickly for a solution to be determined. The minimum gap in the SFS coverage in some embodiments is 10 seconds. Therefore accurate gyroscope propagation is important.

Two gyroscopes are mounted inside the space vehicle in some embodiments. One may be located on the center of the motor mounting block and the other may be located on the ADCS circuit board (i.e., the processing board). The sensor used in some embodiments is the L3G4200D from ST Micro™, which provides angular rates about all 3 axes. The resolution of the gyroscopes may be approximately 8.75 millidegrees/s with a range up to 250 degrees/s. The Allan variance may be approximately 1.38 degrees/√hour, with about 0.014 degrees/√Hz per axis.

Momentum Wheels

The momentum wheel system of some embodiments is based around a Maxon™ 384406 Ø8 mm motor. The motor may be a brushless direct current (DC) system with Hall sensors. The motors may have a space-rated lubricant, such a Castrol™ Braycote Micronic 601 EF.

Each motor may be commutated by an FPGA located on the ADCS circuit board. The FPGA may also use pulse-width modulation to regulate the speed according to a PD control law. The gain for the control law may be configurable on-orbit, if necessary. The FPGA may also provide a memory-mapped interface for the ARM processor to read and adjust the motor speeds. In an embodiment, each wheel is 1.75 inches in diameter and 0.225 inches thick, giving a moment of inertia of $1.68 \times 10^{-5}$ kgm². Some embodiments may use wheels of a different size and/or material, thus yielding a different moment of inertia.

The wheels in some embodiments are arranged in a pyramid formation with a 20° elevation angle. Two motors opposite motors may be run clockwise and two counter-clockwise for a zero net-torque balance when at constant angular velocity. The control law used to control the motors in some embodiments is:

$$\tau = -\Omega J \omega + D\omega + sKq_e \tag{1}$$

where $\tau$ is the command torque, J is the moment of inertia of the space vehicle, $\omega$ is the angular velocity of the space vehicle, $q_e$ is the quaternion error vector between the command and determined attitude, and s is the sign of the scalar quaternion error term. $\Omega$ is the skew-symmetric angular velocity matrix, given by the following:

$$\Omega = \begin{bmatrix} 0 & -\omega_3 & \omega_2 \\ \omega_3 & 0 & -\omega_1 \\ -\omega_2 & \omega_1 & 0 \end{bmatrix} \tag{2}$$

The terms K and D in Eq. (1) are the proportional and derivative gains of the control system. The system is critically damped when the setting time, T, is equal to $8/\omega_n$, where $\omega_n$ is the natural oscillation frequency of the system. For a desired settling time, the gains can be found according to the following:

$$K = 2\omega_n^2 \tag{3}$$

$$D = \sqrt{2K} \tag{4}$$

The command torque from Eq. (1) is then transformed to individual motor velocity commands by a torque distribution matrix. The torque distribution matrix contains the moment of inertia of the wheels themselves. This allows for the same algorithm to be adjusted based on different wheel sizes.

Magnetic Torque Rods

Although they provide much weaker torque than momentum wheels, magnetic torque rods have no moving parts and consume much less power than the wheels. The torque rods for the x- and y-axes in an embodiment are 5.3 cm long, have a 6.4 mm diameter, and have 815 turns. The core may be 1018 steel alloy. The z-axis may have a shorter torque rod, which was 4.4 cm long with 680 turns in this embodiment. The x and y rods produced a dipole moment of $0.596 \times I$ Am$^2$. The z-axis rod produced a dipole moment of $0.412 \times I$ Am$^2$.

The maximum current draw in this embodiment was about 0.5 A, or 1.8 W at 3.3 V. Assuming a 0.3 Gauss magnetic field, the torque rods generate a maximum torque of about 9 μNm, which is roughly equivalent to a milligram at the end of a one-meter lever arm. In practical use, due to the control law dynamics, the torque rods are limited to 0.1 A maximum current draw in this embodiment.

3-axis attitude control using the torque rods is not possible at any given instant in time because the torque rods only act about an axis that is perpendicular to the Earth's magnetic field. However, 3-axis control is possible over an extended period of time because the orientation of the magnetic field relative the space vehicle's body axes changes as the space vehicle moves thorough its orbit.

The control law used for commanding the torque rods may be the same as for the motors, except that the gyroscopic term on the right side of Eq. (1) is ignored.

$$\tau = D\omega + sKq_e \quad (5)$$

The reason that the gyroscopic term can be ignored is that the applied torques are low. Also, the torque rods don't generate enough torque to perform high angular rate maneuvers. As a result, they only need accurate control authority at low rotation rates, for example inertially static sun pointing.

After the command torque has been derived according to Eq. (5), a "requested" dipole moment may be calculated according to the following:

$$m_{req} = \frac{B \times \tau}{|B|^2} \quad (6)$$

where $m_{req}$ is the dipole moment, B is the modeled Earth's magnetic field, and τ is the command torque. The requested dipole moment may then be mapped into a drive current applied to the appropriate torque rods. The IGRF-12 model for the Earth's magnetic field may be used to determine appropriate gain settings. Due to the low amounts of torque generated by the torque rods, settling an initial rotation rate of 1 rpm may take ten hours or more in some embodiments.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An attitude determination and control system (ADCS) for a space vehicle, comprising:
   a plurality of momentum wheels;
   a plurality of magnetic torque rods arranged in a perpendicular orientation with respect to one another, the plurality of magnetic torque rods each configured to generate torque when a current is applied thereto; and
   a processing card comprising a processor, the processing card configured to algorithmically select and control at least one of the plurality of momentum wheels, the plurality of magnetic torque rods, or both, to execute a desired maneuver, wherein
   the processor of the ADCS is different from a processor of another processing card of the space vehicle that performs command and data handling (C&DH) for the space vehicle, and
   the processing card comprises at least one recess through which at least one respective momentum wheel of the plurality of momentum wheels extends, thereby improving compactness of the ADCS.

2. The ADCS of claim 1, wherein the processing card is configured to control the plurality of magnetic torque rods to perform de-tumbling, static sun pointing, nadir pointing operations, or any combination thereof.

3. The ADCS of claim 1, wherein
the processing card comprises a processor and a field programmable gate array (FPGA),
the processing card is controlled by the processor paired with the FPGA, and
the FPGA is configured to provide a memory-mapped interface to other devices of a space vehicle.

4. The ADCS of claim 3, wherein the FPGA comprises watchdog timers that reboot the processor when a system fault occurs.

5. The ADCS of claim 1, wherein the plurality of momentum wheels are arranged in a pyramid configuration with an elevation angle of 20° or more.

6. The ADCS of claim 1, further comprising:
a momentum wheel carriage that houses the plurality of momentum wheels; and
a gyroscope mounted on the momentum wheel carriage, wherein
the processing card is configured to control the gyroscope to propagate an attitude solution when another mechanism for doing so is not available.

7. The ADCS of claim 6, further comprising:
a frame to which the processing card and momentum wheel carriage are attached.

8. The ADCS of claim 1, further comprising:
an independent motor for each of the plurality of momentum wheels, each independent motor configured to drive a respective momentum wheel, wherein
the processing card comprises a processor and a field programmable gate array (FPGA), and
the FPGA of the processing card is configured to control each independent motor by running a proportional-derivative (PD) control loop.

9. The ADCS of claim 8, wherein after determining an attitude error angle between a command attitude and a current attitude solution, the FPGA is configured to apply the PD control loop to the attitude error angle to generate a desired torque setting and drive at least one momentum wheel of the plurality of momentum wheels to a desired speed, apply an appropriate current to at least one of the plurality of magnetic torque rods to generate a requested torque, or both.

10. The ADCS of claim 1, wherein
the ADCS is part of a space vehicle that comprises a top section comprising a high gain helical antenna, a middle section comprising the ADCS, and a bottom section comprising a power subsystem, and
the ADCS is configured to orient the space vehicle based on pointing requirements of the high gain helical antenna with an accuracy of 15° or better.

11. The ADCS of claim 1, wherein the processing card is configured to control the plurality of torque rods in accordance with $$\tau = D\omega + sKq_e$$

where $\tau$ is command torque, $\omega$ is an angular velocity of a space vehicle, $q_e$ is a quaternion error vector between a command and a determined attitude, s is a sign of the scalar quaternion error term, and D and K are proportional and derivative gains of a control system, respectively.

12. The ADCS of claim 11, wherein after deriving the command torque, the processing card is configured to:
calculate a dipole moment using $$m_{req} = \frac{B \times \tau}{|B|^2}$$

where $m_{req}$ is a dipole moment, B is the modeled Earth's magnetic field, and $\tau$ is the command torque; and
deliver a corresponding current command from the dipole moment to be delivered to one or more of the plurality of torque rods.

13. The ADCS of claim 12, wherein the processing card is further configured to use a proportional-derivative (PD) control loop to apply current to one or more of the plurality of torque rods.

14. A space vehicle, comprising:
a top section comprising a high gain helical antenna;
a middle section comprising an attitude determination and control system (ADCS); and
a bottom section comprising a power subsystem, wherein the ADCS comprises:
a plurality of momentum wheels,
a plurality of torque rods, and
a processing card comprising a processor, the processing card configured to control the plurality of momentum wheels and the plurality of torque rods, wherein
the processor of the ADCS is different from a processor of another processing card of the space vehicle that performs command and data handling (C&DH) for the space vehicle,
the processing card comprises at least one recess through which at least one respective momentum wheel of the plurality of momentum wheels extends, thereby improving compactness of the ADCS, and
the ADCS is configured to orient the space vehicle based on pointing requirements of the high gain helical antenna with an accuracy of 15° or better.

15. The space vehicle of claim 14, wherein
the processing card is configured control the plurality of magnetic torque rods to perform de-tumbling, static sun pointing, nadir pointing operations, or any combination thereof.

16. The space vehicle of claim 15, wherein the processing card is configured to control the plurality of torque rods in accordance with $$\tau = D\omega + skq_e$$

where $\tau$ is command torque, $\omega$ is an angular velocity of a space vehicle, $q_e$ is a quaternion error vector between a command and a determined attitude, s is a sign of the scalar quaternion error term, and D and K are proportional and derivative gains of a control system, respectively,
after deriving the command torque, the processing card is configured to:
calculate a dipole moment using $$m_{req} = \frac{B \times \tau}{|B|^2}$$

where $m_{req}$ is a dipole moment, B is the modeled Earth's magnetic field, and $\tau$ is the command torque, and
deliver a corresponding current command from the dipole moment to be delivered to one or more of the plurality of torque rods, and the processing card is further configured to use a proportional-derivative (PD) control loop to apply current to one or more of the plurality of torque rods.

17. The space vehicle of claim 14, wherein the processing card comprises a processor and a field programmable gate array (FPGA), the processing card is controlled by the processor paired with the FPGA, and the FPGA is configured to provide a memory-mapped interface to other devices of the space vehicle.

18. The space vehicle of claim 14, wherein the ADCS further comprises an independent motor for each of the plurality of momentum wheels, each independent motor configured to drive a respective momentum wheel, wherein the processing card comprises a processor and a field programmable gate array (FPGA), the FPGA of the processing card is configured to control each independent motor by running a proportional-derivative (PD) control loop, and after determining an attitude error angle between a command attitude and a current attitude solution, the FPGA is configured to apply the PD control loop to the attitude error angle to generate a desired torque setting and drive at least one momentum wheel of the plurality of momentum wheels to a desired speed, apply an appropriate current to at least one of the plurality of magnetic torque rods to generate a requested torque, or both.

19. An attitude determination and control system (ADCS) for a space vehicle, comprising:

a plurality of momentum wheels;

a plurality of magnetic torque rods arranged perpendicular to one another along an x-axis, a y-axis, and a z-axis, the plurality of magnetic torque rods each configured to generate torque when a current is applied thereto; and a processing card comprising a processor, the processing card configured to algorithmically select and control at least one of the plurality of magnetic torque rods to execute a desired maneuver, wherein the processing card is configured to control the plurality of torque rods in accordance with $$\tau = D\omega + sKq_e$$

where $\tau$ is command torque, $\omega$ is an angular velocity of a space vehicle, $q_e$ is a quaternion error vector between a command and a determined attitude, s is a sign of the scalar quaternion error term, and D and K are proportional and derivative gains of a control system, respectively, after deriving the command torque, the processing card is configured to:

calculate a dipole moment $m_{req}$ using $$m_{req} = \frac{B \times \tau}{|B|^2}$$

where B is the modeled Earth's magnetic field, use a proportional-derivative (PD) control loop to apply current to one or more of the plurality of torque rods, and deliver a corresponding current command from the dipole moment to be delivered to one or more of the plurality of torque rods, the processor of the ADCS is different from a processor of another processing card of the space vehicle that performs command and data handling (C&DH) for the space vehicle, and the processing card comprises at least one recess through which at least one respective momentum wheel of the plurality of momentum wheels extends, thereby improving compactness of the ADCS.

* * * * *